Jan. 29, 1929.
J. H. APPLETON
1,700,250
APPARATUS FOR RESHAPING HAMS
Original Filed Feb. 20, 1926   3 Sheets-Sheet 1
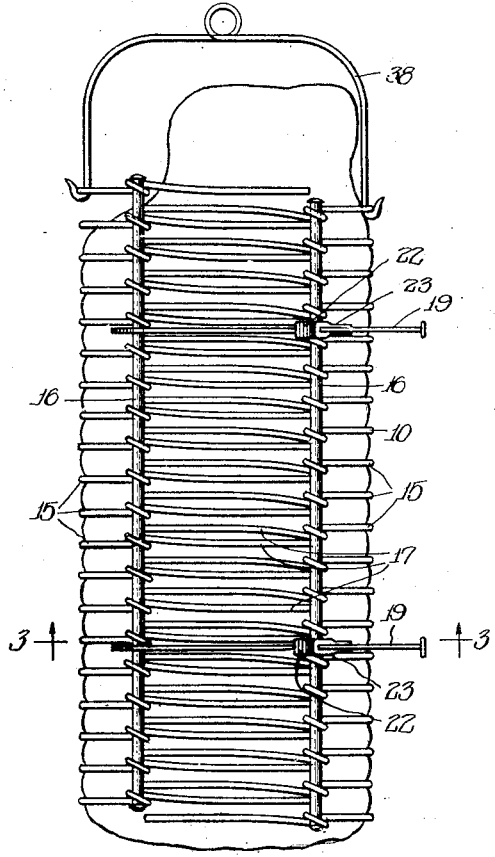
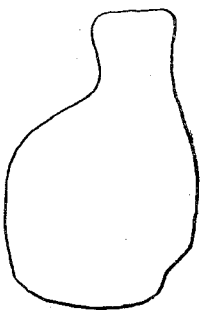
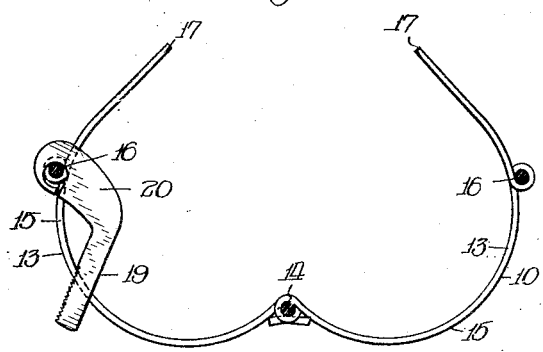
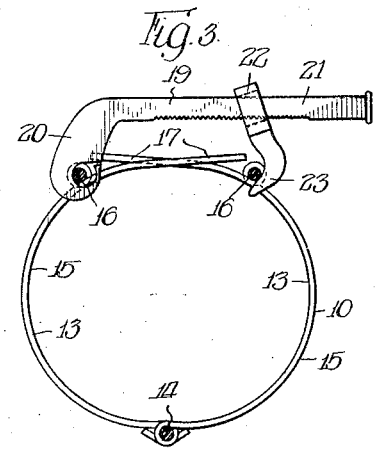
Inventor:
Joseph H Appleton,
By Cromwell, Greist & Warden
Attys.
Witness:
R. Burkhardt Jan. 29, 1929.  
J. H. APPLETON  
APPARATUS FOR RESHAPING HAMS  
Original Filed Feb. 20, 1926   3 Sheets-Sheet 2
1,700,250
Fig. 6.
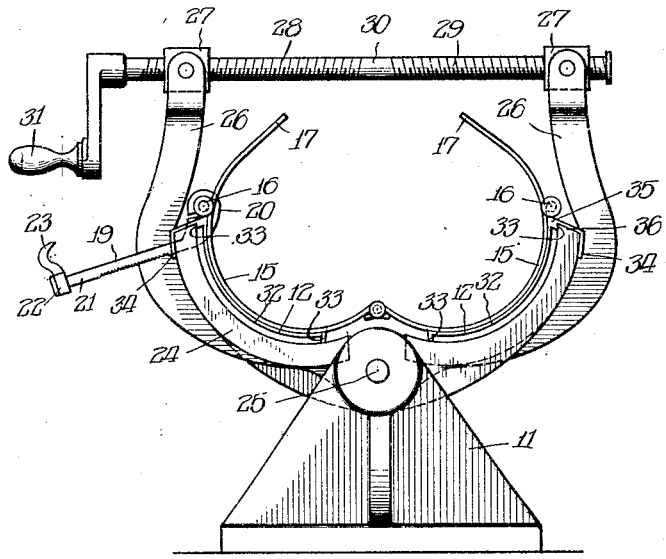
Fig. 7.
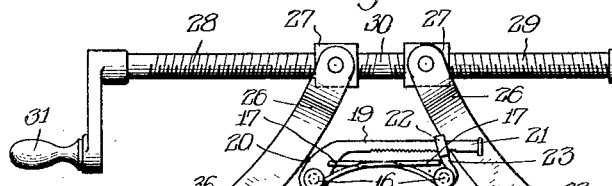
Fig. 8.
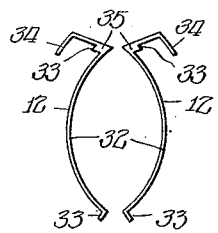
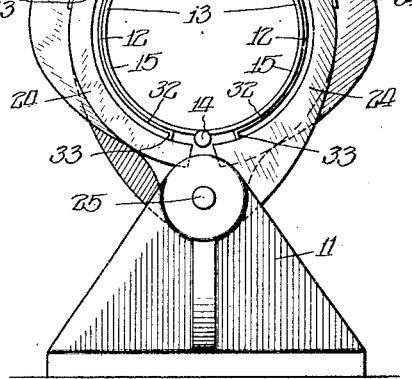
Fig. 9.
Witness:  
R. Burkhardt
Inventor:  
Joseph H. Appleton,  
By Cromwell, Greist & Warden  
attys.

Jan. 29, 1929.  
J. H. APPLETON  
1,700,250  
APPARATUS FOR RESHAPING HAMS  
Original Filed Feb. 20, 1926  3 Sheets-Sheet 3
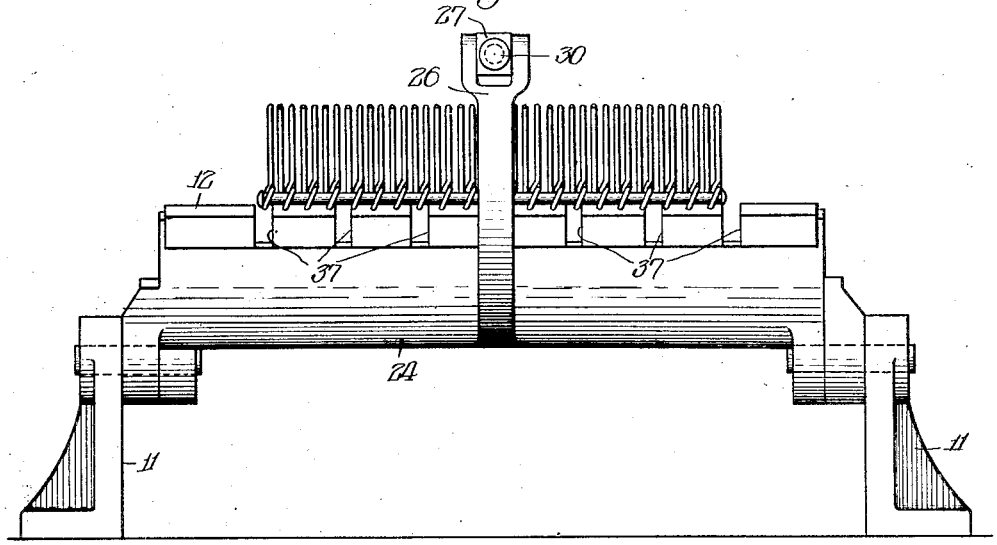
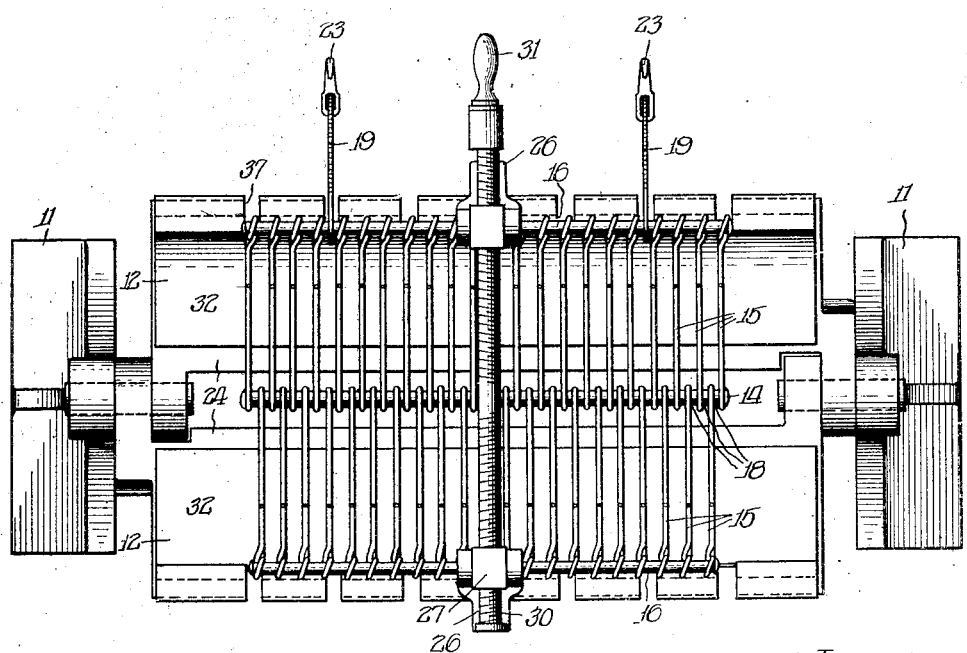

Patented Jan. 29, 1929.

1,700,250

UNITED STATES PATENT OFFICE.

JOSEPH H. APPLETON, OF OSHKOSH, WISCONSIN, ASSIGNOR TO ALLIED PACKERS, INCORPORATED, OF CHICAGO, ILLINOIS, A CORPORATION OF DELAWARE.

APPARATUS FOR RESHAPING HAMS.

Original application filed February 20, 1926, Serial No. 89,538. Divided and this application filed June 15, 1927. Serial No. 189,933.

The invention has to do with the re-shaping of hams, or other smoked joint meats, in accordance with either the Hawkinson method, which is set forth in Patent 1,533,648, or the Cushman method, which is set forth in the pending application of Arthur W. Cushman, Serial No. 81,104, filed January 13, 1926.

The object of the invention is to provide suitable packing house equipment with which the re-shaping of hams, or other smoked joint meats, may be efficiently accomplished.

One form of equipment embodying the invention is herein presented, but such form is to be considered merely as an exemplification, and is not to be construed as limiting the invention short of its true and intended scope as defined in the appended claim.

In the accompanying drawings:

Fig. 1 is a side view of the container, in closed position on a ham;

Fig. 2 is an end view of the same, when open;

Fig. 3 is another end view of the same, when closed;

Fig. 4 is a view of a ham before being re-shaped;

Fig. 5 is another view of the same ham after being re-shaped.

Fig. 6 is an end view of the press, lining members and container, when open;

Fig. 7 is another end view of the same; when closed;

Fig. 8 is a view of the lining members for the press;

Fig. 9 is a similar view of other lining members interchangeable with those shown in Fig. 8;

Fig. 10 is a side view of the press; lining members and container; and

Fig. 11 is a top view of the same.

The equipment illustrated in the drawings consists of a container 10, a press 11 for drawing the container up about a ham, and a pair of lining members 12 for adapting the press to containers of different sizes. The invention resides particularly in the novel construction of the press and the lining members, and in the novel combination of those elements with the container.

The container will first be described. It is of cylindrical form, and consists of two complementary section 13. The sections are semi-cylindrical in form, and are hinged to a rod 14 which extends longitudinally between adjoining edges of the sections. The body portions of the sections are composed of a large number of stiff wire ribs 15 which extends circumferentially of the sections in spaced relation to each other, being loosely looped around the hinging rod 14 to effect pivotal engagement with the same, and being fixedly looped around other reinforcing rods 16. The free ends 17 of the ribs 15 extending from the rods 16 are more or less straight, so that, when the rods 16 of the two sections are brought towards each other in closing the container, the ends 17 will lap with each other to any desired extent without interfering with the rods 16. The ribs 15 of one section are arranged in staggered relation to those of the other section, and small spacer rings 18 are positioned on the rod 14 between the looped ends of adjoining ribs.

The container is held closed by two or more latching devices 19, each of which includes an elongated member 20 which is of angular form and is apertured at one end to fit loosely about and pivot on the rod 16 of one section. The member 20 is flat, being preferably formed of sheet metal, and is slitted at the aperture in order to permit one side of the apertured portion to be sprung sufficiently to encompass the rod 16. A long extension 21 is provided on the member 20, and a friction clamp 22 is slidably mounted on the extension. The clamp 22 may be shifted bodily to any desired position along the extension 21 when maintained in a perpendicular position relative to the same, but will bind tightly on the extension and become immovable in one direction when tilted into an angular position relative to the same. The end of the extension 21 is upset to form a limiting abutment for the clamp. The free end of the clamp 22 is curved to form a hook 23 for engagement with the rod 16 of the other section, and, when the container has been closed to the desired extent about a ham, the member 20 is swung into a position with the hook of the clamp adjacent the rod 16 of the other section, and the end of the clamp opposite the hook is returned along the extension as far as possible when in a tilted position with the hook in engagement with the rod, whereupon the clamp will bind on the extension and will prevent separation of the sections of the container when the external pressure applied thereto is released.

The particular container construction hereinbefore described is covered in my copending application, Serial No. 89,538, of which this application is a division. In so far as the present invention is concerned, any other generally similar container may be used in cooperation with the press and lining members now to be described.

The press consists of two curved platens 24 which are pivotally mounted to swing toward and away from each other about a common axis 25. Two arms 26 extend upwardly from the platens, and are bifurcated to receive two blocks 27. The blocks 27 are pivotally mounted in the bifurcated portions of the arms 26 and are interiorly screw-threaded to engage with right and left hand threads 28 and 29 on a rotatable rod 30. A hand crank 31 is secured to one end of the rod 30, and, when rotated in one direction, moves the blocks 27 with the arms 26 and platens 24 toward each other.

The container is placed open in the press, as shown in Figs. 6, 10 and 11, and the ham or other smoked joint meat to be re-shaped is in turn placed in the container. The container, instead of being positioned with the two sections thereof in direct peripheral contact with the platens of the press, is supported upon two lining members 32 which have substantially the same curvature as the sections of the container. The members 32 extend throughout the length of the platens, and are seated against the platens in such manner as to be readily removable therefrom, being supported against the curved faces of the platens by inturned shoulders 33, and being hooked over the free margins of the platens by flanges 34. The purpose of the lining members 32 is to adapt a single press to work in connection with containers of different sizes. For medium sized hams, a container would be used of a size readily accommodated by the lining members 32; for large sized hams, a larger container would be used, and the lining members 32 would be removed from the press, permitting the container to bear directly against the platens; while for small sized hams, a smaller container would be used and lining members 32' would be substituted for the members 32, the members 32' fitting against and hooking about the platens 24 in substantially the same manner as the members 32, but being of greater curvature to conform with the smaller container.

When the container is open in the press ready to receive a ham, the reinforcement rods 16 on the outer sides of the sections of the container hook over the corners 35 or 35' of the lining members 32 or 32', or the corners 36 of the platens when no lining members are used, and the sections of the container are as a consequence properly positioned within the press. When the container is open in the press, the latching devices 19 carried by the rod 16 of one of the sections may be swung into an unobstructed position in recesses 37 which are formed in the upper margins of the lining members and platens for that purpose. The container, when drawn up about a ham to re-shape the same, may be suspended from a suitable support by means of a bail 38.

I claim:

In apparatus of the character described, a press having two curved platens mounted for movement toward and away from each other, and two adapter members for lining the pressing surfaces of the platens, said members being shaped to conform with the desired shape of the object to be pressed and having portions bearing against the faces of the platens and other portions hooked over the margins of the platens.

In testimony whereof I have hereunto subscribed my name.

JOSEPH H. APPLETON.